US012579373B2

(12) United States Patent
Umapathy et al.

(10) Patent No.: US 12,579,373 B2
(45) Date of Patent: Mar. 17, 2026

(54) SYSTEM AND METHOD FOR SYNTHETIC TEXT GENERATION TO SOLVE CLASS IMBALANCE IN COMPLAINT IDENTIFICATION

(71) Applicant: JPMorgan Chase Bank, N.A., New York, NY (US)

(72) Inventors: Anjana Umapathy, Mountain View, CA (US); Amol Mavuduru, Richardson, TX (US); Xiao Wu, Santa Clara, CA (US); Abhik Banerjee, Milpitas, CA (US); Brenda Ng, Danville, CA (US); Venkata H Rao, Great Neck Plaza, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 516 days.

(21) Appl. No.: 17/992,340

(22) Filed: Nov. 22, 2022

(65) Prior Publication Data

US 2024/0169159 A1 May 23, 2024

(51) Int. Cl.
*G06F 40/40* (2020.01)
*G06F 16/23* (2019.01)
(Continued)

(52) U.S. Cl.
CPC .............. *G06F 40/40* (2020.01); *G06F 16/23* (2019.01); *G06F 40/123* (2020.01);
(Continued)

(58) Field of Classification Search
CPC ........ G06F 40/40; G06F 16/23; G06F 40/123; G06F 40/166; G06F 40/253; G06F 40/56; G06F 40/30; G06N 20/00; G06N 3/08
See application file for complete search history.

(56) References Cited

U.S. PATENT DOCUMENTS 11,790,411 B1 * 10/2023 Mann ................. G06Q 30/0281
704/9
2018/0225591 A1 * 8/2018 Chandramouli ....... G06N 20/00
(Continued)

OTHER PUBLICATIONS

Korvola, A. M. (2021). Extracting information from customer complaints: hybrid approach to sentiment analysis of unlabeled data. (Year: 2021).*

*Primary Examiner* — Richemond Dorvil
*Assistant Examiner* — Zeeshan Mahmood Shaikh
(74) *Attorney, Agent, or Firm* — GREENBLUM & BERNSTEIN, P.L.C.

(57) ABSTRACT

A computer based system and method for synthetic text generation includes a processor. The processor implements a text style transfer algorithm to first input data to generate complaints data from non-complaint emails data associated with a plurality non-complaint emails. The processor converts the plurality of non-complaint emails into a first set of complaint emails based on implementing the text style transfer algorithm and implements a text generation model algorithm to second input data to generate a second set of complaint emails from a plurality of complaint emails. The processor also generates a set of synthetic complaint emails based on the generated first set of complaint emails and the second set of complaint emails; trains a model based on the generated synthetic complaint emails; and applies the trained model to a new set of emails to resolve class imbalance in automatic complaint identification from the new set of emails.

17 Claims, 6 Drawing Sheets

500

(51) Int. Cl.
   *G06F 40/123*    (2020.01)
   *G06F 40/166*    (2020.01)
   *G06F 40/253*    (2020.01)
   *G06N 20/00*    (2019.01)

(52) U.S. Cl.
   CPC .......... *G06F 40/166* (2020.01); *G06F 40/253*
             (2020.01); *G06N 20/00* (2019.01)

(56)                References Cited

U.S. PATENT DOCUMENTS

| | | | |
|---|---|---|---|
| 2020/0193380 A1* | 6/2020 | Muthuswamy Sivaraman ............ | |
| | | | G06F 40/216 |
| 2020/0387570 A1* | 12/2020 | Biswas ................... | G06F 40/30 |
| 2021/0158366 A1* | 5/2021 | Arnold ................. | G06F 40/253 |
| 2022/0028555 A1* | 1/2022 | Neumann ................ | G06N 5/02 |
| 2022/0043977 A1* | 2/2022 | Dani ..................... | G06F 40/284 |
| 2022/0405275 A1* | 12/2022 | Purnell .............. | G06F 21/6245 |
| 2023/0076279 A1* | 3/2023 | Lin ........................ | G06F 40/35 |

* cited by examiner

200

300

500

600

SYSTEM AND METHOD FOR SYNTHETIC TEXT GENERATION TO SOLVE CLASS IMBALANCE IN COMPLAINT IDENTIFICATION

TECHNICAL FIELD

This disclosure generally relates to data processing, and, more particularly, to methods and apparatuses for implementing a platform and language agnostic synthetic text generation module configured to solve/tackle class imbalance in complaint identification.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, and competitive analysis, to name but a few. In general, large enterprises, corporations, agencies, institutions, and other organizations are facing a continuing problem of handling, processing, and/or accurately identifying complaint data from emails, voice mails, etc., received from clients via various portals that are crucial to plan actions in an efficient and expedited manner to improve overall client satisfaction and business performance.

Large enterprises, corporations, agencies, institutions, and other organizations are typically bound by consumer laws to address consumer complaints in a timely manner. Complaint emails, received as freeform text, are difficult to detect from non-complaint emails because complaints are scarce. Also, during a typical email communication, there appears to be multiple email exchanges between the client and the service provider, which may have different sections in the email chain housing complaints.

Per consumer laws, large enterprises, corporations, agencies, institutions, and other organizations are typically required to independently monitor customer complaints. Conventional systems are not reliable to independently identify complaints. Typical manual complaint identification is extremely tedious, expensive, and time-consuming. Although keyword-based filters may help reduce manual work, but lead to too many false positives.

To identify the right context in the email chain, and to predict whether an email is a complaint or not, labelled data for both positive class (emails flagged as complaints) and negative class (emails flagged as non-complaints) may be required. However, the scarcity of complaint emails means that the labelled data distribution is highly skewed, which may adversely affect the performance of such a classification system. Specifically, within a typical large corporation, i.e., JPMorgan and Chase, only around 7 out of 1000 emails have been found to contain complaints.

Thus, there is a need for an advanced tool to augment the labelled data to include more samples (i.e., complaint emails) from the positive class, to ensure that a classification system is adequately trained to recognize complaint emails, to avoid the situation that a poorly trained system would be fraught with false assumptions.

SUMMARY

The present disclosure, through one or more of its various aspects, embodiments, and/or specific features or sub-components, provides, among other features, various systems, servers, devices, methods, media, programs, and platforms for implementing a platform and language agnostic synthetic text generation module configured to solve/tackle conventional class imbalance in complaint email identification, but the disclosure is not limited thereto. For example, the present disclosure, through one or more of its various aspects, embodiments, and/or specific features or sub-components, also provides, among other features, various systems, servers, devices, methods, media, programs, and platforms for implementing a platform and language agnostic synthetic text generation module configured to augment the labelled data to include more samples (i.e., complaint emails) from the positive class, to ensure that a classification system is adequately trained to recognize complaint emails, to avoid the situation that a poorly trained system would be fraught with false assumptions, but the disclosure is not limited thereto.

For example, the platform and language agnostic synthetic text generation module as disclosed herein is configured to implement a robust solution for timely complaint email identification and monitoring, improving overall client experience, thereby provide the following advantages over conventional tools: timely detection of complaints mitigates exposure to risk of revenue loss due to client attrition and potential class-action lawsuits; analysis of detected complaints improves lead time in addressing pressing problems and helps derive insights into areas of improvement; saves time and effort of manual labor to tag complaint emails thereby eliminating any need for a client experience officer to manually go through tens of thousands of emails to identify around a hundred complaints, but the disclosure is not limited thereto.

According to an aspect of the present disclosure, a method for synthetic text generation to resolve class imbalance in complaint identification by utilizing one or more processors along with allocated memory is disclosed. The method may include: accessing a database that stores sample emails labelled as a plurality of non-complaint emails and a plurality of complaint emails; invoking an application programming interface to receive first input data from the plurality of non-complaint emails and second input data from the plurality of complaint emails; implementing a text style transfer algorithm to the first input data to generate complaints data from non-complaint emails data associated with the plurality non-complaint emails; converting the plurality of non-complaint emails into a first set of complaint emails based on implementing the text style transfer algorithm; implementing a text generation model algorithm to the second input data to generate a second set of complaint emails from the plurality of complaint emails; generating a set of synthetic complaint emails based on the generated first set of complaint emails and the second set of complaint emails; training a model based on the generated synthetic complaint emails; and applying the trained model to a new set of emails to resolve class imbalance in automatic complaint identification from the new set of emails.

According to a further aspect of the present disclosure, the method may further include: obtaining a set of synthetic complaints by appending the generated first set of complaint emails with the generated second set of complaint emails.

According to another aspect of the present disclosure, the method may further include: removing sensitive information data from the received first input data and the second input data prior to generating the first set of complaint emails and the second set of complaint emails; and storing, after removing the sensitive information data, the first input data and the second input data onto a cloud data storage.

According to yet another aspect of the present disclosure, the sensitive information data may include one or more of the following data: personally identifiable data, name, address, phone number, social security number, credit card information, bank account, email address, customer spending data, customer health data, automated teller machine usage data, customer location data, employee information data, and sensitive company data, but the disclosure is not limited thereto.

According to an aspect of the present disclosure, in training the model based on the generated synthetic complaint emails, the method may further include: receiving the stored first input data and the second input data from the cloud data storage; generating the synthetic complaint emails based on the received first input data and the second input data; training the model based on the generated synthetic complaint emails.

According to another aspect of the present disclosure, the method may further include: invalidating the prediction data based on determining that the prediction data is less than the configurable threshold value; and discarding emails associated with the invalidated prediction data prior to retraining the initial model.

According to yet another aspect of the present disclosure, in validating the prediction data, the method may further include: implementing an artificial intelligence algorithm to automatically review the prediction data; automatically determining, in response to the implemented artificial intelligence algorithm, that the prediction data meets a configurable threshold value; and automatically validating the prediction data based on determining that the prediction data is equal to or more than the configurable threshold value.

According to an aspect of the present disclosure, the method may further include: automatically invalidating the prediction data based on determining that the prediction data is less than the configurable threshold value; and automatically discarding emails associated with the invalidated prediction data prior to retraining the initial model.

According to a further aspect of the present disclosure, the method may further include: identifying verified complaint emails based on validating the prediction data; augmenting sample dataset with the verified complaint emails; and updating the database that stores the sample emails with the augmented sample dataset.

According to an aspect of the present disclosure, a system for synthetic text generation to resolve class imbalance in complaint identification is disclosed. The system may include: a processor; and a memory operatively connected to the processor via a communication interface, the memory storing computer readable instructions, when executed, may cause the processor to: access a database that stores sample emails labelled as a plurality of non-complaint emails and a plurality of complaint emails; invoke an application programming interface to receive first input data from the plurality of non-complaint emails and second input data from the plurality of complaint emails; implement a text style transfer algorithm to the first input data to generate complaints data from non-complaint emails data associated with the plurality non-complaint emails; convert the plurality of non-complaint emails into a first set of complaint emails based on implementing the text style transfer algorithm; implement a text generation model algorithm to the second input data to generate a second set of complaint emails from the plurality of complaint emails; generate a set of synthetic complaint emails based on the generated first set of complaint emails and the second set of complaint emails; train a model based on the generated synthetic complaint emails; and apply the trained model to a new set of emails to resolve class imbalance in automatic complaint identification from the new set of emails.

According to a further aspect of the present disclosure, the processor may be further configured to: obtain a set of synthetic complaints by appending the generated first set of complaint emails with the generated second set of complaint emails.

According to another aspect of the present disclosure, the processor may be further configured to: remove sensitive information data from the received first input data and the second input data prior to generating the first set of complaint emails and the second set of complaint emails; and store, after removing the sensitive information data, the first input data and the second input data onto a cloud data storage.

According to an aspect of the present disclosure, in training the model based on the generated synthetic complaint emails, the processor may be further configured to: receive the stored first input data and the second input data from the cloud data storage; generate the synthetic complaint emails based on the received first input data and the second input data; train the model based on the generated synthetic complaint emails.

According to a further aspect of the present disclosure, in validating the prediction data, the processor may be further configured to: manually review the prediction data by a user utilizing a user interface; receive user input from the user via the user interface, wherein the user input indicates whether the prediction data meets a configurable threshold value; and validate the prediction data based on determining that the prediction data is equal to or more than the configurable threshold value.

According to another aspect of the present disclosure, the processor may be further configured to: invalidate the prediction data based on determining that the prediction data is less than the configurable threshold value; and discard emails associated with the invalidated prediction data prior to retraining the initial model.

According to yet another aspect of the present disclosure, in validating the prediction data, the processor may be further configured to: implement an artificial intelligence algorithm to automatically review the prediction data; automatically determine, in response to the implemented artificial intelligence algorithm, that the prediction data meets a configurable threshold value; and automatically validate the prediction data based on determining that the prediction data is equal to or more than the configurable threshold value.

According to an aspect of the present disclosure, the processor may be further configured to: automatically invalidate the prediction data based on determining that the prediction data is less than the configurable threshold value; and automatically discard emails associated with the invalidated prediction data prior to retraining the initial model.

According to a further aspect of the present disclosure, the processor may be further configured to: identify verified complaint emails based on validating the prediction data; augment sample dataset with the verified complaint emails;

and update the database that stores the sample emails with the augmented sample dataset.

According to an aspect of the present disclosure, a non-transitory computer readable medium configured to store instructions for synthetic text generation to resolve class imbalance in complaint identification is disclosed. The instructions, when executed, may cause a processor to perform the following: accessing a database that stores sample emails labelled as a plurality of non-complaint emails and a plurality of complaint emails; invoking an application programming interface to receive first input data from the plurality of non-complaint emails and second input data from the plurality of complaint emails; implementing a text style transfer algorithm to the first input data to generate complaints data from non-complaint emails data associated with the plurality non-complaint emails; converting the plurality of non-complaint emails into a first set of complaint emails based on implementing the text style transfer algorithm; implementing a text generation model algorithm to the second input data to generate a second set of complaint emails from the plurality of complaint emails; generating a set of synthetic complaint emails based on the generated first set of complaint emails and the second set of complaint emails; training a model based on the generated synthetic complaint emails; and applying the trained model to a new set of emails to resolve class imbalance in automatic complaint identification from the new set of emails.

According to a further aspect of the present disclosure, the instructions, when executed, may cause the processor to perform the following: obtaining a set of synthetic complaints by appending the generated first set of complaint emails with the generated second set of complaint emails.

According to another aspect of the present disclosure, the instructions, when executed, may cause the processor to perform the following: removing sensitive information data from the received first input data and the second input data prior to generating the first set of complaint emails and the second set of complaint emails; and storing, after removing the sensitive information data, the first input data and the second input data onto a cloud data storage.

According to an aspect of the present disclosure, in training the model based on the generated synthetic complaint emails, the instructions, when executed, may cause the processor to perform the following: receiving the stored first input data and the second input data from the cloud data storage; generating the synthetic complaint emails based on the received first input data and the second input data; training the model based on the generated synthetic complaint emails.

According to another aspect of the present disclosure, the instructions, when executed, may cause the processor to perform the following: invalidating the prediction data based on determining that the prediction data is less than the configurable threshold value; and discarding emails associated with the invalidated prediction data prior to retraining the initial model.

According to yet another aspect of the present disclosure, in validating the prediction data, the instructions, when executed, may cause the processor to perform the following: implementing an artificial intelligence algorithm to automatically review the prediction data; automatically determining, in response to the implemented artificial intelligence algorithm, that the prediction data meets a configurable threshold value; and automatically validating the prediction data based on determining that the prediction data is equal to or more than the configurable threshold value.

According to an aspect of the present disclosure, the instructions, when executed, may cause the processor to perform the following: automatically invalidating the prediction data based on determining that the prediction data is less than the configurable threshold value; and automatically discarding emails associated with the invalidated prediction data prior to retraining the initial model.

According to a further aspect of the present disclosure, the instructions, when executed, may cause the processor to perform the following: identifying verified complaint emails based on validating the prediction data; augmenting sample dataset with the verified complaint emails; and updating the database that stores the sample emails with the augmented sample dataset.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
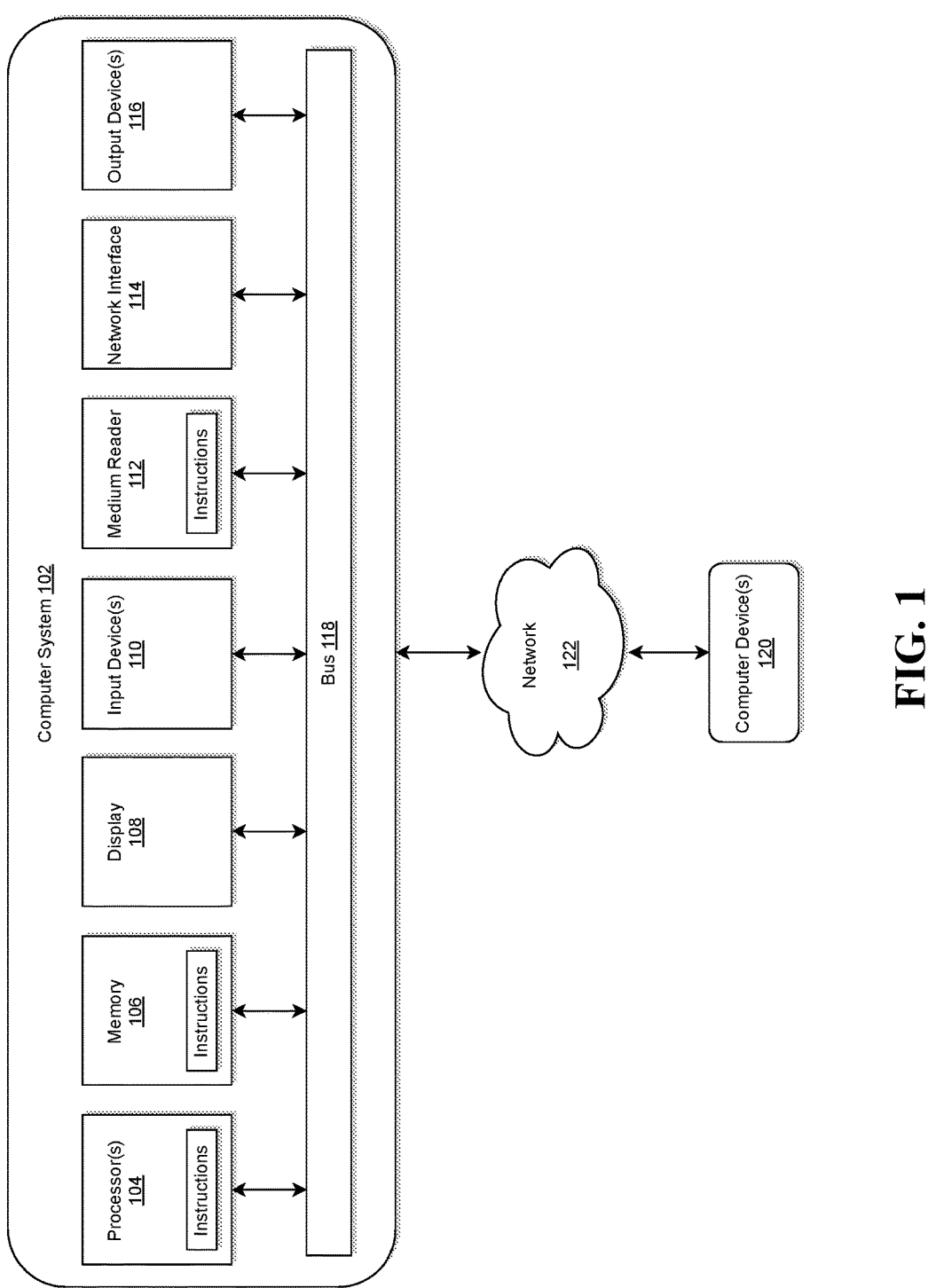
FIG. 1 illustrates a computer system for implementing a platform, language, and cloud agnostic synthetic text generation module configured to solve conventional class imbalance in complaint identification in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and language agnostic synthetic text generation module configured to solve conventional class imbalance in complaint identification in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the synthetic text generation module may be platform, language, and cloud agnostic that may allow for consistent easy orchestration and passing of data through various components to output a desired result regardless of platform, language, and cloud environment. Since the disclosed process, according to exemplary embodiments, is platform, language, and cloud agnostic, the synthetic text generation module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
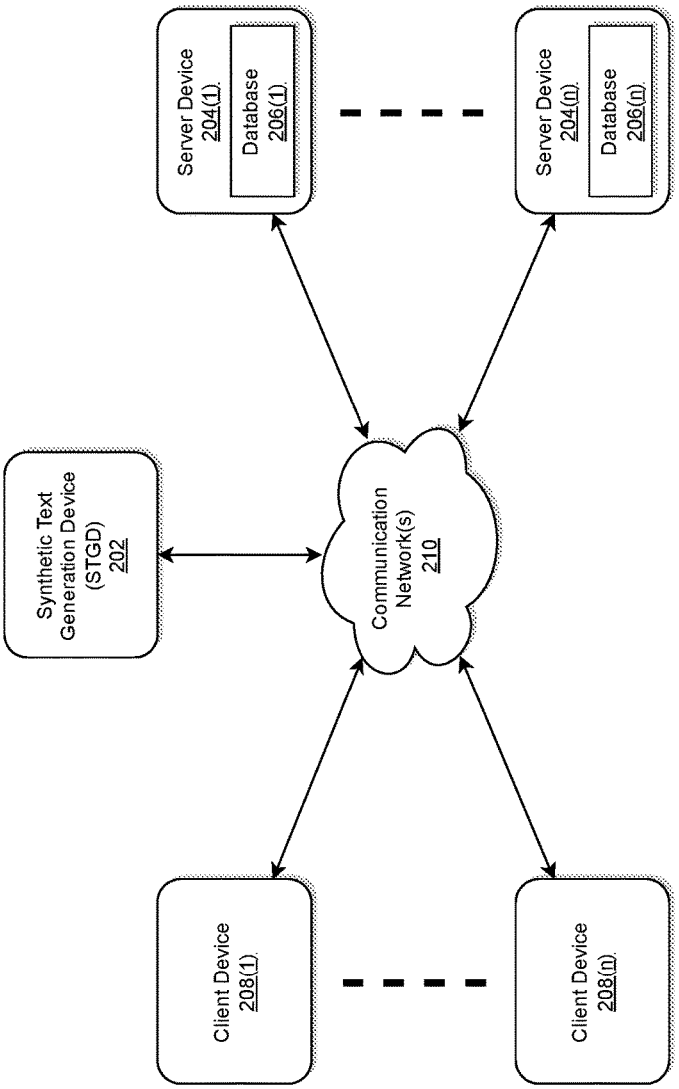
FIG. 2 illustrates an exemplary diagram of a network environment with a platform, language, and cloud agnostic synthetic text generation device in accordance with an exemplary embodiment.

Referring to FIG. 2, a schematic of an exemplary network environment 200 for implementing a language, platform, and cloud agnostic synthetic text generation device (STGD) of the instant disclosure is illustrated.

According to exemplary embodiments, the above-described problems associated with conventional tools may be overcome by implementing a STGD 202 as illustrated in FIG. 2 that may be configured for implementing a platform and language agnostic synthetic text generation module configured to solve conventional class imbalance in complaint identification, but the disclosure is not limited thereto. For example, according to exemplary embodiments, the above-described problems associated with conventional tools may be overcome by implementing a STGD 202 as illustrated in FIG. 2 that may be configured for implementing a platform and language agnostic synthetic text generation module configured to augment the labelled data to include more samples (i.e., complaint emails) from the positive class, to ensure that a classification system is adequately trained to recognize complaint emails, to avoid the situation that a poorly trained system would be fraught with false assumptions, but the disclosure is not limited thereto. For example, according to exemplary embodiments, the above-described problems associated with conventional tools may be overcome by implementing a STGD 202 as illustrated in FIG. 2 that may be configured for implementing a platform and language agnostic synthetic text generation module configured to implement a robust solution for timely complaint email identification and monitoring, improving overall client experience, thereby provide the following advantages over conventional tools: timely detection of complaints mitigates exposure to risk of revenue loss due to client attrition and potential class-action lawsuits; analysis of detected complaints improves lead time in addressing pressing problems and helps derive insights into areas of improvement; saves time and effort of manual labor to tag complaint emails thereby eliminating any need for a client experience officer to manually go through tens of thousands of emails to identify around a hundred complaints, but the disclosure is not limited thereto.

The STGD 202 may be the same or similar to the computer system 102 as described with respect to FIG. 1.

The STGD 202 may store one or more applications that can include executable instructions that, when executed by the STGD 202, cause the STGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the STGD 202 itself, may be located in virtual server(s) running in a cloud-based computing environment rather than being tied to one or more specific physical network computing devices. Also, the application(s) may be running in one or more virtual machines (VMs) executing on the STGD 202. Additionally, in one or more embodiments of this technology, virtual machine(s) running on the STGD 202 may be managed or supervised by a hypervisor.

In the network environment 200 of FIG. 2, the STGD 202 is coupled to a plurality of server devices 204(1)-204(n) that hosts a plurality of databases 206(1)-206(n), and also to a plurality of client devices 208(1)-208(n) via communication network(s) 210. A communication interface of the STGD 202, such as the network interface 114 of the computer system 102 of FIG. 1, operatively couples and communicates between the STGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the STGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The STGD 202 may be a standalone device or integrated with one or more other devices or apparatuses, such as one or more of the server devices 204(1)-204(n), for example. In one particular example, the STGD 202 may be hosted by one of the server devices 204(1)-204(n), and other arrangements are also possible. Moreover, one or more of the devices of the STGD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the STGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the STGD 202 that may efficiently provide a platform for implementing a platform and language agnostic synthetic text generation module configured to solve conventional class imbalance in complaint identification, but the disclosure is not limited thereto. For example, according to exemplary embodiments, the client devices 208(1)-208(n) in this example may include any type of computing device that can facilitate the implementation of the STGD 202 that may efficiently provide a platform for implementing a platform and language agnostic synthetic text generation module configured to implement a robust solution for timely complaint email identification and monitoring, improving overall client experience, thereby provide the following advantages over conventional tools: timely detection of complaints mitigates exposure to risk of revenue loss due to client attrition and potential class-action lawsuits; analysis of detected complaints improves lead time in addressing pressing problems and helps derive insights into areas of improvement; saves time and effort of manual labor to tag complaint emails thereby eliminating any need for a client experience officer to manually go through tens of thousands of emails to identify around a hundred complaints, but the disclosure is not limited thereto. For example, according to exemplary embodiments, the client devices 208(1)-208(n) in this example may include any type of computing device that can facilitate the implementation of the STGD 202 that may efficiently provide a platform for implementing a platform and language agnostic synthetic text generation module configured to augment the labelled data to include more samples (i.e., complaint emails) from the positive class, to ensure that a classification system is adequately trained to recognize complaint emails, to avoid the situation that a poorly trained system would be fraught with false assumptions, but the disclosure is not limited thereto.

The client devices 208(1)-208(n) may run interface applications, such as standard web browsers or standalone client applications, which may provide an interface to communicate with the STGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the STGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the STGD 202, the server devices 204(1)-204(n), or the client devices 208(1)-208(n), for example, may be configured to operate as virtual instances on the same physical machine. For example, one or more of the STGD 202, the server devices 204(1)-204(n), or the client devices 208(1)-208(n) may operate on the same physical device rather than as separate devices communicating through communication network(s) 210. Additionally, there may be more or fewer STGDs 202, server devices 204(1)-204(n), or client devices 208(1)-208(n) than illustrated in FIG. 2. According to exemplary embodiments, the STGD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
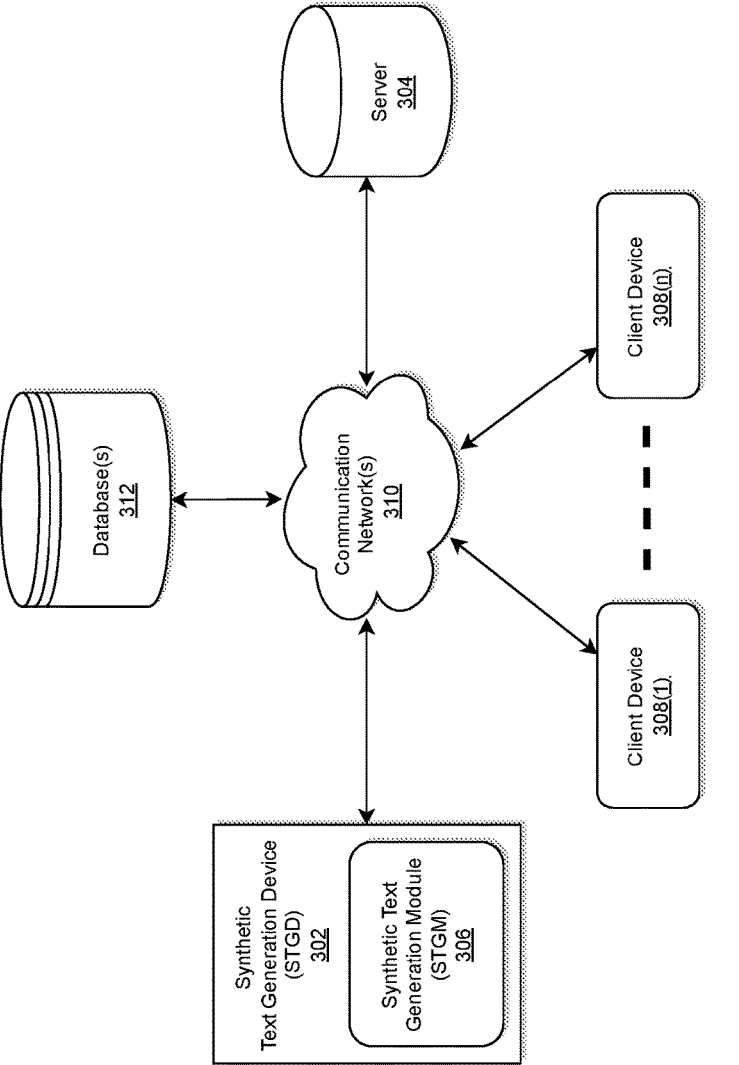
FIG. 3 illustrates a system diagram for implementing a platform, language, and cloud agnostic synthetic text generation device having a platform and language agnostic synthetic text generation module in accordance with an exemplary embodiment.

FIG. 3 illustrates a system diagram for implementing a platform, language, and cloud agnostic STGD having a platform, language, and cloud agnostic synthetic text generation module (STGM) in accordance with an exemplary embodiment.

As illustrated in FIG. 3, the system 300 may include a STGD 302 within which an STGM 306 is embedded, a server 304, a database(s) 312, a plurality of client devices 308(1) . . . 308(n), and a communication network 310.

According to exemplary embodiments, the STGD 302 including the STGM 306 may be connected to the server 304, and the database(s) 312 via the communication network 310. The STGD 302 may also be connected to the plurality of client devices 308(1) . . . 308(n) via the communication network 310, but the disclosure is not limited thereto.

According to exemplary embodiment, the STGD 302 is described and shown in FIG. 3 as including the STGM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the STGM 306 may be configured to receive real-time feed of data from the plurality of client devices 308(1) . . . 308(n) via the communication network 310.

As may be described below, the STGM 306 may be configured to: access a database that stores sample emails labelled as a plurality of non-complaint emails and a plurality of complaint emails; invoke an application programming interface to receive first input data from the plurality of non-complaint emails and second input data from the plurality of complaint emails; implement a text style transfer algorithm to the first input data to generate complaints data from non-complaint emails data associated with the plurality non-complaint emails; convert the plurality of non-complaint emails into a first set of complaint emails based on implementing the text style transfer algorithm; implement a text generation model algorithm to the second input data to generate a second set of complaint emails from the plurality of complaint emails; generate a set of synthetic complaint emails based on the generated first set of complaint emails and the second set of complaint emails; train a model based on the generated synthetic complaint emails; and apply the trained model to a new set of emails to resolve class imbalance in automatic complaint identification from the new set of emails, but the disclosure is not limited thereto.

The plurality of client devices 308(1) . . . 308(n) are illustrated as being in communication with the STGD 302. In this regard, the plurality of client devices 308(1) . . . 308(n) may be "clients" (e.g., customers) of the STGD 302 and are described herein as such. Nevertheless, it is to be known and understood that the plurality of client devices 308(1) . . . 308(n) need not necessarily be "clients" of the STGD 302, or any entity described in association therewith herein. Any additional or alternative relationship may exist between either or both of the plurality of client devices 308(1) . . . 308(n) and the STGD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the STGD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The STGD 302 may be the same or similar to the STGD 202 as described with respect to FIG. 2, including any features or combination of features described with respect thereto.

Figure 4:
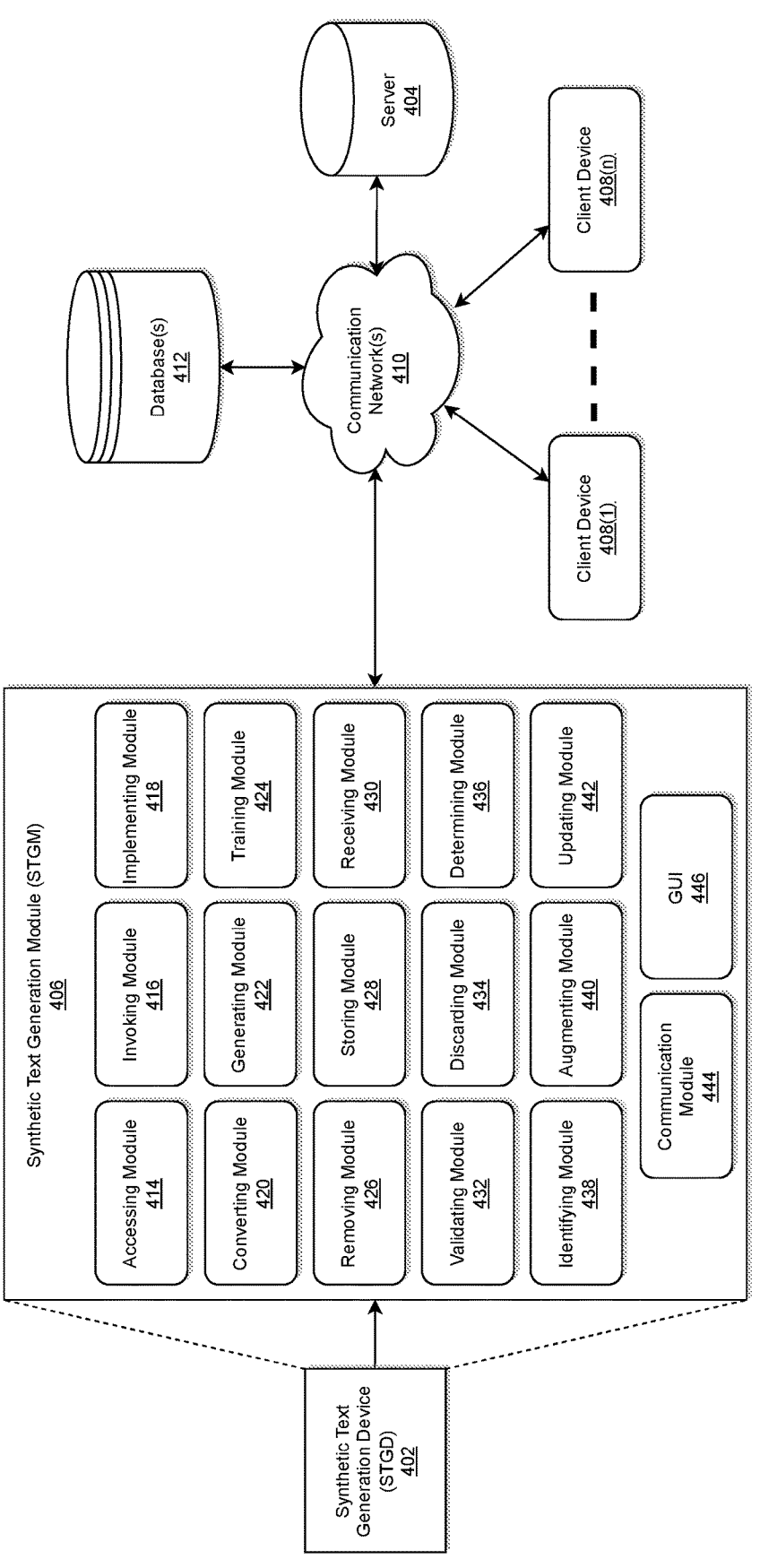
FIG. 4 illustrates a system diagram for implementing a platform, language, and cloud agnostic synthetic text generation module of FIG. 3 in accordance with an exemplary embodiment.

FIG. 4 illustrates a system diagram for implementing a platform, language, and cloud agnostic STGM of FIG. 3 in accordance with an exemplary embodiment.

According to exemplary embodiments, the system 400 may include a platform, language, and cloud agnostic STGD 402 within which a platform, language, and cloud agnostic STGM 406 is embedded, a server 404, database(s) 412, and a communication network 410.

According to exemplary embodiments, the STGD 402 including the STGM 406 may be connected to the server 404 and the database(s) 412 via the communication network 410. The STGD 402 may also be connected to the plurality of client devices 408(1)-408(n) via the communication network 410, but the disclosure is not limited thereto. The STGM 406, the server 404, the plurality of client devices 408(1)-408(n), the database(s) 412, the communication network 410 as illustrated in FIG. 4 may be the same or similar to the STGM 306, the server 304, the plurality of client devices 308(1)-308(n), the database(s) 312, the communication network 310, respectively, as illustrated in FIG. 3.

According to exemplary embodiments, as illustrated in FIG. 4, the STGM 406 may include an accessing module 414, an invoking module 416, an implementing module 418, a converting module 420, a generating module 422, a training module 424, a removing module 426, a storing module 428, a receiving module 430, a validating module 432, a discarding module 434, a determining module 436, an identifying module 438, an augmenting module 440, an updating module 442, a communication module 444, and a graphical user interface (GUI) 446. According to exemplary embodiments, interactions and data exchange among these modules included in the STGM 406 provide the advantageous effects of the disclosed invention. Functionalities of each module of FIG. 4 may be described in detail below with reference to FIGS. 4-6.

According to exemplary embodiments, each of the accessing module 414, invoking module 416, implementing module 418, converting module 420, generating module 422, training module 424, removing module 426, storing module 428, receiving module 430, validating module 432, discarding module 434, determining module 436, identifying module 438, augmenting module 440, updating module 442, and the communication module 444 of the STGM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the accessing module 414, invoking module 416, implementing module 418, converting module 420, generating module 422, training module 424, removing module 426, storing module 428, receiving module 430, validating module 432, discarding module 434, determining module 436, identifying module 438, augmenting module 440, updating module 442, and the communication module 444 of the STGM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the accessing module 414, invoking module 416, implementing module 418, converting module 420, generating module 422, training module 424, removing module 426, storing module 428, receiving module 430, validating module 432, discarding module 434, determining module 436, identifying module 438, augmenting module 440, updating module 442, and the communication module 444 of the STGM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the accessing module 414, invoking module 416, implementing module 418, converting module 420, generating module 422, training module 424, removing module 426, storing module 428, receiving module 430, validating module 432, discarding module 434, determining module 436, identifying module 438, augmenting module 440, updating module 442, and the communication module 444 of the STGM 406 of FIG. 4 may be called via corresponding API.

According to exemplary embodiments, the process implemented by the STGM 406 may be executed via the communication module 444 and the communication network 410, which may comprise plural networks as described above. For example, in an exemplary embodiment, the various components of the STGM 406 may communicate with the server 404, and the database(s) 412 via the communication module 444 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
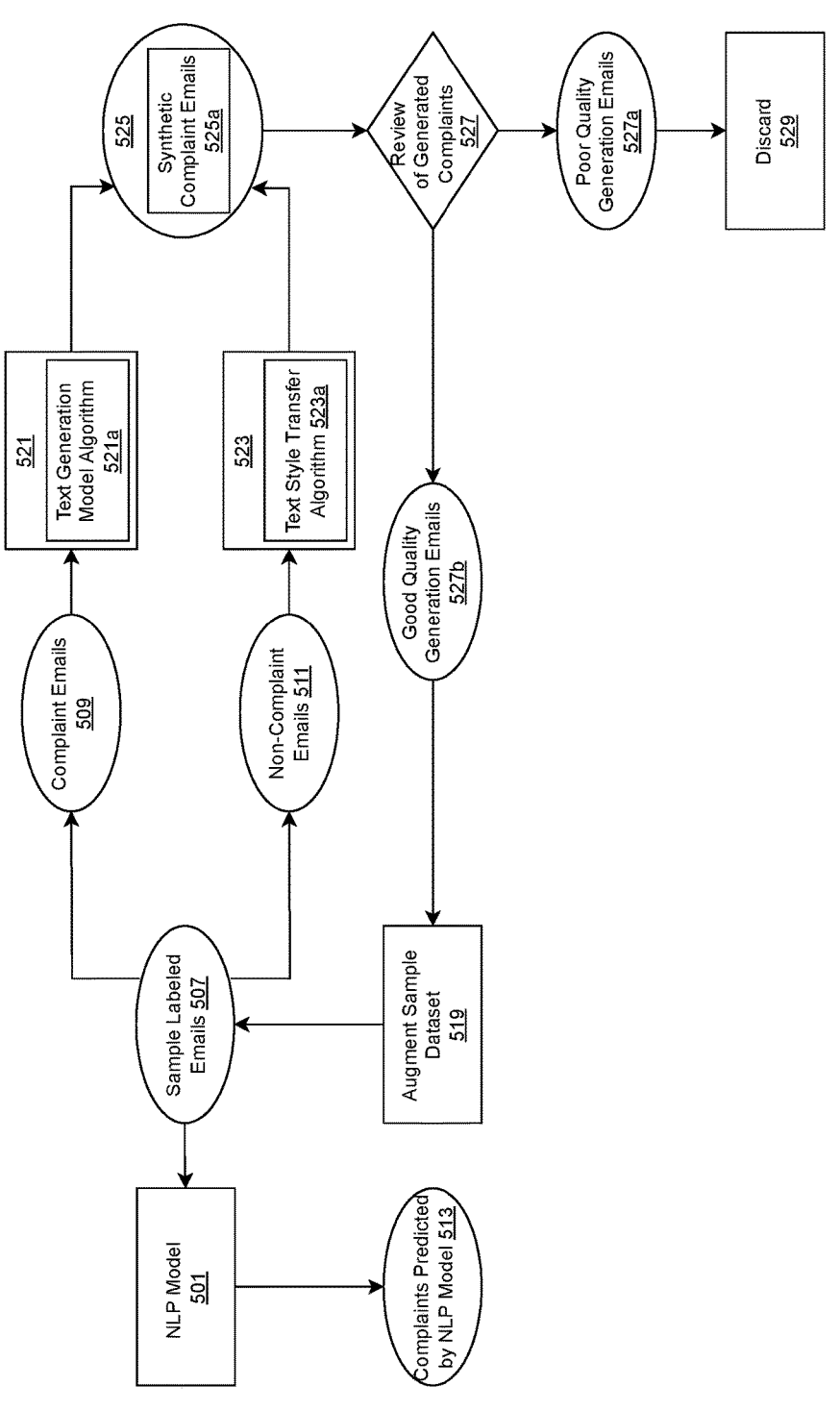
FIG. 5 illustrates an exemplary synthetic text generation flow diagram implemented by the platform, language, and cloud agnostic synthetic text generation module of FIG. 4 in accordance with an exemplary embodiment.

According to exemplary embodiments, FIG. 5 illustrates an exemplary synthetic text generation flow diagram 500 implemented by the platform, language, and cloud agnostic STGM 406 of FIG. 4 in accordance with an exemplary embodiment.

The following explanations will be provided by referring to both FIGS. 4-5.

As illustrated in FIG. 5, the exemplary synthetic text generation flow architecture diagram 500 includes a natural language processing (NLP) model 501 that may be utilized in complaint identification by the identifying module 438. The NLP model 501 may be trained by the training module 424 based on utilizing sample labelled emails 507 that may include complaint emails 509 and non-complaint emails 511.

According to exemplary embodiments, as illustrated in the exemplary synthetic text generation flow diagram 500, at step 513, complaints may be predicted by the NLP model 501. The verified complaint emails may be utilized to augment sample dataset at step 519 of the exemplary synthetic text generation flow diagram 500. The augmented sample dataset may be utilized to update the sample labelled emails 507.

According to exemplary embodiments, at step 521 of the exemplary synthetic text generation flow diagram 500, the implementing module 418 may be configured to implement a text generation model algorithm, i.e., GPT-2 or TextGAN, but the disclosure is not limited thereto, to the complaint emails 509. At step 523 of the exemplary synthetic text generation flow diagram 500, the implementing module 418 may be further configured to implement a text style transfer algorithm, i.e., by training sentiment style transfer models, but the disclosure is not limited thereto, to convert the non-complaint emails 511 into complaint emails to increase the number of sample complaint emails for training/re-training the NLP model 501. At step 525 of the exemplary synthetic text generation flow diagram 500, output from steps 521 and 523 may be inferred to generate synthetic complaint emails At step 527 of the exemplary synthetic text generation flow diagram 500, the determining module 436 may be configured to determine (i.e., review of generated complaints) whether the generated synthetic complaint emails are poor quality generation emails 527a or good quality generation emails 527b based on comparing to a configurable threshold value by reviewing the generated complaints. The poor quality generation emails 527a may be discarded by the discarding module 434 so that these poor quality generation emails 527a are not included in training and/re-training the NLP model 501. The good quality generation emails 527b may be kept/utilized for training and/re-training the NLP model 501. For example, at step 529 of the exemplary synthetic text generation flow diagram 500, the good quality generation emails 527b may be utilized by the augmenting module 440 to augment the sample dataset for training and/or re-training the NLP model 501.

According to exemplary embodiments, output, i.e., redacted email data, may be stored onto a cloud data storage. The cloud data storage may be the same or similar to the database(s) 412 as illustrated in FIG. 4. As illustrated in FIG. 4, the training module 424 may fetch email data from the cloud data storage to train an initial model The generating module 422 may generate predictions on unlabeled samples using the initial model. Data from the generating module 422 may flow to the validating module 432 which may validate, and cleanup feedback data received from a user via a user interface (i.e., same or similar to the GUI 446 as illustrated in FIG. 4). The feedback data may include predictions data that have been validated by the user by manually reviewing the predictions data utilizing the user interface. The feedback data may also include predictions data automatically generated by an artificial intelligence/machine learning model.

According to exemplary embodiments, the validated predictions data output from the validating module 432 may be utilized by the training module 424 to retrain the initial model and output improved models which are feedback to the generating module 422. For example, the generating module 422, the validating module 432, the training module 424 and the models form a feedback loop that enhances the performances of the STGM 406 as illustrated in FIG. 4.

According to exemplary embodiments, the STGM 406 may be configured to balance any possible data imbalance and utilized the balanced data to validate the generated data and feature distributions for retraining the models. The balanced data may also be utilized by the generating module 422 to generate synthetic text as well as samples (i.e., sample complaint emails as disclosed herein with reference to FIGS. 4-5) and augment the samples (i.e., sample dataset) using, i.e., synonym and antonym replacement, but the disclosure is not limited thereto, as disclosed above with reference to FIGS. 4 and 5.

For example, referring back to FIGS. 4-5, according to exemplary embodiments, the accessing module 414 may be configured to access the database(s) 412, 612 that stores sample labelled emails 507 labelled as a plurality of non-complaint emails 509 and a plurality of complaint emails 511. The invoking module 416 may be configured to invoke an API to receive first input data from the plurality of non-complaint emails 509 and second input data from the plurality of complaint emails 511. The implementing module 418 may be configured to implement a text style transfer algorithm 523a to the first input data to generate complaints data from non-complaint emails data associated with the plurality non-complaint emails 511. The converting module 420 may be configured to convert the plurality of non-complaint emails 511 into a first set of complaint emails based on implementing the text style transfer algorithm 523a. According to exemplary embodiments, the implementing module 418 may be further configured to implement a text generation model algorithm 521a to the second input data to generate a second set of complaint emails from the plurality of complaint emails 509. The generating module 422 may be configured to generate a set of synthetic complaint emails 525a based on the generated first set of complaint emails and the second set of complaint emails. The training module 424 may be configured to train a model (i.e., NLP model 501 as illustrated in FIG. 5) based on the generated synthetic complaint emails 525a. The implementing module 418 may then apply the trained model to a new set of emails to resolve class imbalance in automatic complaint identification from the new set of emails.

As illustrated in FIG. 5, the above described processes form a feedback loop for automatically identifying complaint from emails and resolving class imbalance. Thus, the STGM 406 may be configured to augment the labelled data to include more samples (i.e., complaint emails) from the positive class, to ensure that a classification system is adequately trained to recognize complaint emails, to avoid the situation that a poorly trained system would be fraught with false assumptions, but the disclosure is not limited thereto. Accordingly, the platform and language agnostic STGM 406 as disclosed herein may be configured to implement a robust solution for timely complaint email identification and monitoring, improving overall client experience, thereby provide the following advantages over conventional tools: timely detection of complaints mitigates exposure to risk of revenue loss due to client attrition and potential class-action lawsuits; analysis of detected complaints improves lead time in addressing pressing problems and helps derive insights into areas of improvement; saves time and effort of manual labor to tag complaint emails thereby eliminating any need for a client experience officer to manually go through tens of thousands of emails to identify around a hundred complaints, but the disclosure is not limited thereto.

Referring back to FIGS. 4-5, according to exemplary embodiments, the implementing module 418 may be further configured to obtain a set of synthetic complaints (i.e., synthetic complaint emails 525a) by appending the generated first set of complaint emails from the complaint emails 509 with the generated second set of complaint emails from the non-complaint emails 511.

Referring back to FIGS. 4-6, according to exemplary embodiments, the removing module 426 may be configured to remove sensitive information data from the received first input data and the second input data prior to generating the first set of complaint emails and the second set of complaint emails. The storing module 428 may be configured to store, after removing the sensitive information data, the first input data and the second input data onto a cloud data storage.

Again, referring back to FIGS. 4-5, according to exemplary embodiments, in training the model (i.e., NLP model 501) based on the generated synthetic complaint emails 525a, the receiving module 430 may be configured to receive the stored first input data and the second input data from the cloud data storage. In response, the generating module 422 may be configured to generate the synthetic complaint emails 525a based on the received first input data and the second input data. The training module 424 may be configured to train the model 501 based on the generated synthetic complaint emails 525a. The training module 424 may be configured to re-train the model 501 based on validating the prediction data. The generating module 422 may be further configured to generate an improved model based on the re-trained model 501.

According to exemplary embodiments, the discarding module 434 may be configured to discard emails associated with the invalidated prediction data prior to retraining the model 501.

Referring back to FIGS. 4 and 6, according to exemplary embodiments, in validating the prediction data, the implementing module 418 may be further configured to implement an artificial intelligence/machine learning model that applies an AI/ML algorithm to automatically review the prediction data; automatically determine, by utilizing the determining module 436, in response to the implemented AI/ML algorithm, that the prediction data meets a configurable threshold value; and automatically validate, by utilizing the validating module 432, the prediction data based on determining that the prediction data is equal to or more than the configurable threshold value. According to exemplary embodiments, the validating module 432 may be further configured to: automatically invalidate the prediction data based on determining that the prediction data is less than the configurable threshold value. The discarding module 434 may be automatically discard emails associated with the invalidated prediction data prior to retraining the model 501. According to exemplary embodiments, the identifying module 438 may be further configured to identify verified complaint emails based on validating the prediction data and the augmenting module 440 may be configured to augment sample dataset with the verified complaint emails. In response, the updating module 442 may be configured to update the database 412 (i.e., cloud data storage) that stores the sample emails with the augmented sample dataset.

Figure 6:
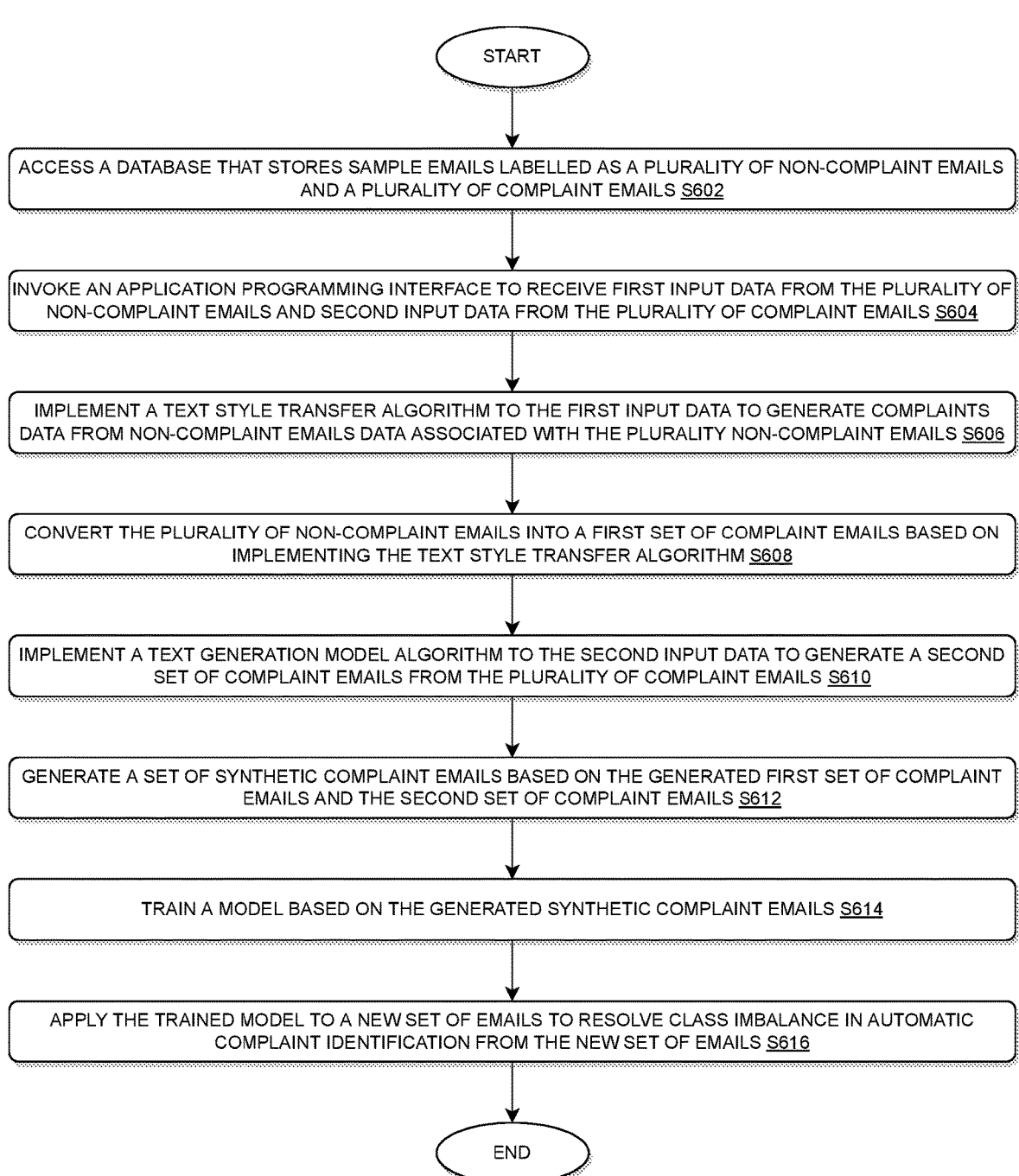
FIG. 6 illustrates an exemplary flow chart implemented by the platform, language, and cloud agnostic synthetic text generation module of FIG. 4 for solving conventional class imbalance in complaint identification in accordance with an exemplary embodiment.

FIG. 6 illustrates an exemplary flow chart 600 implemented by the platform, language, and cloud agnostic STGM 406 of FIG. 4 for solving conventional class imbalance in complaint identification in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include accessing a database that stores sample emails labelled as a plurality of non-complaint emails and a plurality of complaint emails.

At step S604, the process 600 may include invoking an API to receive first input data from the plurality of non-complaint emails and second input data from the plurality of complaint emails.

At step S606, the process 600 may include implementing a text style transfer algorithm to the first input data to generate complaints data from non-complaint emails data associated with the plurality non-complaint emails.

At step S608, the process 600 may include converting the plurality of non-complaint emails into a first set of complaint emails based on implementing the text style transfer algorithm.

At step S610, the process 600 may include implementing a text generation model algorithm to the second input data to generate a second set of complaint emails from the plurality of complaint emails.

At step S612, the process 600 may include generating a set of synthetic complaint emails based on the generated first set of complaint emails and the second set of complaint emails.

At step S614, the process 600 may include training a model based on the generated synthetic complaint emails.

At step S616, the process 600 may include applying the trained model to a new set of emails to resolve class imbalance in automatic complaint identification from the new set of emails.

According to exemplary embodiments, the process 600 may further include: obtaining a set of synthetic complaints by appending the generated first set of complaint emails with the generated second set of complaint emails.

According to exemplary embodiments, the process 600 may further include: removing sensitive information data from the received first input data and the second input data prior to generating the first set of complaint emails and the second set of complaint emails; and storing, after removing the sensitive information data, the first input data and the second input data onto a cloud data storage.

According to exemplary embodiments, in the process 600, the sensitive information data may include one or more of the following data: personally identifiable data, name, address, phone number, social security number, credit card information, bank account, email address, customer spending data, customer health data, automated teller machine usage data, customer location data, employee information data, and sensitive company data, but the disclosure is not limited thereto.

According to exemplary embodiments, in training the model based on the generated synthetic complaint emails, the process 600 may further include: receiving the stored first input data and the second input data from the cloud data storage; generating the synthetic complaint emails based on the received first input data and the second input data; training the model based on the generated synthetic complaint emails.

According to exemplary embodiments, in validating the prediction data, the process 600 may further include: manually reviewing the prediction data by a user utilizing a user interface; receiving user input from the user via the user interface, wherein the user input indicates whether the prediction data meets a configurable threshold value; and validating the prediction data based on determining that the prediction data is equal to or more than the configurable threshold value.

According to exemplary embodiments, the process 600 may further include: invalidating the prediction data based on determining that the prediction data is less than the configurable threshold value; and discarding emails associated with the invalidated prediction data prior to retraining the initial model.

According to exemplary embodiments, in validating the prediction data, the process 600 may further include: implementing an artificial intelligence algorithm to automatically review the prediction data; automatically determining, in response to the implemented artificial intelligence algorithm, that the prediction data meets a configurable threshold value; and automatically validating the prediction data based on determining that the prediction data is equal to or more than the configurable threshold value.

According to exemplary embodiments, the process 600 may further include: automatically invalidating the prediction data based on determining that the prediction data is less than the configurable threshold value; and automatically discarding emails associated with the invalidated prediction data prior to retraining the initial model.

According to exemplary embodiments, the process 600 may further include: identifying verified complaint emails based on validating the prediction data; augmenting sample dataset with the verified complaint emails; and updating the database that stores the sample emails with the augmented sample dataset.

According to exemplary embodiments, the STGD 402 may include a memory (e.g., a memory 106 as illustrated in FIG. 1) which may be a non-transitory computer readable medium that may be configured to store instructions for implementing a platform, language, and cloud agnostic STGM 406 for synthetic text generation to resolve class imbalance in complaint identification as disclosed herein. The STGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the STGM 406 within the STGD 402, may be used to perform one or more of the methods and processes as described herein. In a particular embodiment, the instructions may reside completely, or at least partially, within the memory 106, the medium reader 112, and/or the processor 104 (see FIG. 1) during execution by the STGD 402.

According to exemplary embodiments, the instructions, when executed, may cause a processor embedded within the STGM 406 or the STGD 402 to perform the following: accessing a database that stores sample emails labelled as a plurality of non-complaint emails and a plurality of complaint emails; invoking an application programming interface to receive first input data from the plurality of non-complaint emails and second input data from the plurality of complaint emails; implementing a text style transfer algorithm to the first input data to generate complaints data from non-complaint emails data associated with the plurality non-complaint emails; converting the plurality of non-complaint emails into a first set of complaint emails based on implementing the text style transfer algorithm; implementing a text generation model algorithm to the second input data to generate a second set of complaint emails from the plurality of complaint emails; generating a set of synthetic complaint emails based on the generated first set of complaint emails and the second set of complaint emails; training a model based on the generated synthetic complaint emails; and applying the trained model to a new set of emails to resolve class imbalance in automatic complaint identification from the new set of emails. According to exemplary embodiments, the processor may be the same or similar to the processor 104 as illustrated in FIG. 1 or the processor embedded within STGD 202, STGD 302, STGD 402, and STGM 406.

According to exemplary embodiments, the instructions, when executed, may cause the processor 104 to perform the following: obtaining a set of synthetic complaints by appending the generated first set of complaint emails with the generated second set of complaint emails.

According to exemplary embodiments, the instructions, when executed, may cause the processor 104 to perform the following: removing sensitive information data from the received first input data and the second input data prior to generating the first set of complaint emails and the second set of complaint emails; and storing, after removing the sensitive information data, the first input data and the second input data onto a cloud data storage.

According to exemplary embodiments, in training the model based on the generated synthetic complaint emails, the instructions, when executed, may cause the processor 104 to perform the following: receiving the stored first input data and the second input data from the cloud data storage; generating the synthetic complaint emails based on the received first input data and the second input data; training the model based on the generated synthetic complaint emails.

According to exemplary embodiments, the instructions, when executed, may cause the processor 104 to perform the following: invalidating the prediction data based on determining that the prediction data is less than the configurable threshold value; and discarding emails associated with the invalidated prediction data prior to retraining the initial model.

According to exemplary embodiments, in validating the prediction data, the instructions, when executed, may cause the processor 104 to perform the following: implementing an artificial intelligence algorithm to automatically review the prediction data; automatically determining, in response to the implemented artificial intelligence algorithm, that the prediction data meets a configurable threshold value; and automatically validating the prediction data based on determining that the prediction data is equal to or more than the configurable threshold value.

According to exemplary embodiments, the instructions, when executed, may cause the processor 104 to perform the following: automatically invalidating the prediction data based on determining that the prediction data is less than the configurable threshold value; and automatically discarding emails associated with the invalidated prediction data prior to retraining the initial model.

According to exemplary embodiments, the instructions, when executed, may cause the processor 104 to perform the following: identifying verified complaint emails based on validating the prediction data; augmenting sample dataset with the verified complaint emails; and updating the database that stores the sample emails with the augmented sample dataset.

According to exemplary embodiments as disclosed above in FIGS. 1-6, technical improvements effected by the instant disclosure may include a platform for implementing a platform, language, and cloud agnostic synthetic text generation module configured to solve conventional class imbalance in complaint identification, but the disclosure is not limited thereto. For example, according to exemplary embodiments as disclosed above in FIGS. 1-6, technical improvements effected by the instant disclosure may also include a platform for implementing a platform and language agnostic synthetic text generation module configured to augment the labelled data to include more samples (i.e., complaint emails) from the positive class, to ensure that a classification system is adequately trained to recognize complaint emails, to avoid the situation that a poorly trained system would be fraught with false assumptions, but the disclosure is not limited thereto. For example, according to exemplary embodiments as disclosed above in FIGS. 1-6, technical improvements effected by the instant disclosure may also include a platform for implementing a platform and language agnostic synthetic text generation module configured to implement a robust solution for timely complaint email identification and monitoring, improving overall client experience, thereby provide the following advantages over conventional tools: timely detection of complaints mitigates exposure to risk of revenue loss due to client attrition and potential class-action lawsuits; analysis of detected complaints improves lead time in addressing pressing problems and helps derive insights into areas of improvement; saves time and effort of manual labor to tag complaint emails thereby eliminating any need for a client experience officer to manually go through tens of thousands of emails to identify around a hundred complaints, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a nontransitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for synthetic text generation to resolve class imbalance in complaint identification by utilizing one or more processors along with allocated memory, the method comprising:

implementing a synthetic text generation module (STGM), by a synthetic text generation device, configured to identify class imbalance in complaint emails identification and augment labelled data to include additional complaint emails from a positive class to train a model, wherein the STGM includes an accessing module, an invoking module, an implementing module, a converting module, a generating module, a removing module, an augmenting module, and a training module, wherein each module being called via a corresponding application programming interface;

accessing, by calling the accessing module, a database that stores the labelled data that includes sample emails labelled as a plurality of non-complaint emails and a plurality of complaint emails;

invoking, by calling the invoking module, the application programming interface to receive first input data from the plurality of non-complaint emails and second input data from the plurality of complaint emails;

removing, by calling the removing module, sensitive information data from the received first input data and the second input data;

implementing, by calling the implementing module, a text style transfer algorithm to the first input data after removing the sensitive information data from the received first input data to generate complaints data from non-complaint emails data associated with the plurality non-complaint emails;

labeling, by calling the converting module, the plurality of non-complaint emails as a first set of complaint emails based on implementing the text style transfer algorithm;

augmenting, by calling the augmenting module, the plurality of complaint emails within the database with the labeled first set of complaint emails to train the model;

implementing, by calling the implementing module, a text generation model algorithm to the second input data to generate a second set of complaint emails from the plurality of complaint emails;

generating, by calling the generating module, a set of synthetic complaint emails based on the generated first set of complaint emails and the second set of complaint emails and obtaining the set of synthetic complaint emails by appending the generated first set of complaint emails with the generated second set of complaint emails;

validating, by a validating module communicatively coupled to the generating module, predictions on unlabeled samples generated by the initial model using user feedback received via a graphical user interface (GUI);

utilizing, by the training module, validated predictions data output from the validating module to retrain the initial model, thereby forming a feedback loop among the generating module, validating module, and training module that enhances performance of the STGM;

balancing, by the STGM, any possible data imbalance utilizing balanced data to validate generated data and feature distributions for retraining the models, wherein the balanced data is further utilized to generate and augment synthetic text samples using synonym and antonym replacement;

training, by calling the training module, the model based on the generated synthetic complaint emails; and applying, by the STGM, the trained model to a new set of emails to resolve the class imbalance in automatic complaint identification from the new set of emails.

2. The method according to claim 1, further comprising:

storing, after removing the sensitive information data, the first input data and the second input data onto a cloud data storage.

3. The method according to claim 2, wherein the sensitive information data includes one or more of the following data: personally identifiable data, name, address, phone number, social security number, credit card information, bank account, email address, customer spending data, customer health data, automated teller machine usage data, customer location data, employee information data, and sensitive company data.

4. The method according to claim 2, wherein, in training the model based on the generated synthetic complaint emails, the method further comprising:

receiving the stored first input data and the second input data from the cloud data storage;

generating the synthetic complaint emails based on the received first input data and the second input data; and training the model based on the generated synthetic complaint emails.

5. The method according to claim 4, further comprising:

invalidating prediction data based on determining that the prediction data is less than the configurable threshold value; and discarding emails associated with the invalidated prediction data prior to training the model.

6. The method according to claim 4, further comprising:

identifying verified complaint emails based on validating the prediction data;

augmenting sample dataset with the verified complaint emails; and updating the database that stores the sample emails with the augmented sample dataset.

7. The method according to claim 2, wherein in validating the prediction data, the method further comprising:

implementing an artificial intelligence algorithm to automatically review the prediction data;

automatically determining, in response to the implemented artificial intelligence algorithm, that the prediction data meets a configurable threshold value; and automatically validating the prediction data based on determining that the prediction data is equal to or more than the configurable threshold value.

8. The method according to claim 7, further comprising:

automatically invalidating the prediction data based on determining that the prediction data is less than the configurable threshold value; and automatically discarding emails associated with the invalidated prediction data prior to retraining the initial model.

9. A system for synthetic text generation to resolve class imbalance in complaint identification, the system comprising:

a processor; and a memory operatively connected to the processor via a communication interface, the memory storing computer readable instructions, when executed, causes the processor to:

implement a synthetic text generation module (STGM), by a synthetic text generation device, configured to identify class imbalance in complaint emails identification and augment labelled data to include additional complaint emails from a positive class to train a model, wherein the STGM includes an accessing module, an invoking module, an implementing module, a converting module, a generating module, a removing module, an augmenting module, and a training module, wherein each module being called via a corresponding application programming interface;

access, by calling the accessing module, a database that stores the labelled data that includes sample emails labelled as a plurality of non-complaint emails and a plurality of complaint emails;

invoke, by calling the invoking module, the application programming interface to receive first input data from the plurality of non-complaint emails and second input data from the plurality of complaint emails;

remove, by calling the removing module, sensitive information data from the received first input data and the second input data;

implement, by calling the implementing module, a text style transfer algorithm to the first input data after removing the sensitive information data from the received first input data to generate complaints data from non-complaint emails data associated with the plurality non-complaint emails;

label, by calling the converting module, the plurality of non-complaint emails as a first set of complaint emails based on implementing the text style transfer algorithm;

augment, by calling the augmenting module, the plurality of complaint emails within the database with the labeled first set of complaint emails to train the model;

implement, by calling the implementing module, a text generation model algorithm to the second input data to generate a second set of complaint emails from the plurality of complaint emails;

generate, by calling the generating module, a set of synthetic complaint emails based on the generated first set of complaint emails and the second set of complaint emails and obtain the set of synthetic complaint emails by appending the generated first set of complaint emails with the generated second set of complaint emails;

validating, by a validating module communicatively coupled to the generating module, predictions on unlabeled samples generated by the initial model using user feedback received via a graphical user interface (GUI);

utilizing, by the training module, validated predictions data output from the validating module to retrain the initial model, thereby forming a feedback loop among the generating module, validating module, and training module that enhances performance of the STGM;

balancing, by the STGM, any possible data imbalance utilizing balanced data to validate generated data and feature distributions for retraining the models, wherein the balanced data is further utilized to generate and augment synthetic text samples using synonym and antonym replacement;

train, by calling the training module, the model based on the generated synthetic complaint emails; and apply, by the STGM, the trained model to a new set of emails to resolve the class imbalance in automatic complaint identification from the new set of emails.

10. The system according to claim 9, wherein the processor is further configured to:

store, after removing the sensitive information data, the first input data and the second input data onto a cloud data storage.

11. The system according to claim 10, wherein the sensitive information data includes one or more of the following data: personally identifiable data, name, address, phone number, social security number, credit card information, bank account, email address, customer spending data, customer health data, automated teller machine usage data, customer location data, employee information data, and sensitive company data.

12. The system according to claim 10, in training the model based on the generated synthetic complaint emails, the processor is further configured to:

receive the stored first input data and the second input data from the cloud data storage;

generate the synthetic complaint emails based on the received first input data and the second input data;

train the model based on the generated synthetic complaint emails.

13. The system according to claim 12, wherein the processor is further configured to:

invalidate prediction data based on determining that the prediction data is less than the configurable threshold value; and discard emails associated with the invalidated prediction data prior to training the model.

14. The system according to claim 10, in validating the prediction data, the processor is further configured to:

implement an artificial intelligence algorithm to automatically review the prediction data;

automatically determine, in response to the implemented artificial intelligence algorithm, that the prediction data meets a configurable threshold value;

automatically validate the prediction data based on determining that the prediction data is equal to or more than the configurable threshold value.

15. The system according to claim 14, wherein the processor is further configured to:

automatically invalidate the prediction data based on determining that the prediction data is less than the configurable threshold value; and automatically discard emails associated with the invalidated prediction data prior to retraining the initial model.

16. A non-transitory computer readable medium configured to store instructions for synthetic text generation to resolve class imbalance in complaint identification, the instructions, when executed, cause a processor to perform the following:

implementing a synthetic text generation module (STGM), by a synthetic text generation device, configured to identify class imbalance in complaint emails identification and augment labelled data to include additional complaint emails from a positive class to train a model, wherein the STGM includes an accessing module, an invoking module, an implementing module, a converting module, a generating module, a removing module, an augmenting module, and a training module, wherein each module being called via a corresponding application programming interface;

accessing, by calling the accessing module, a database that stores the labelled data that includes sample emails labelled as a plurality of non-complaint emails and a plurality of complaint emails;

invoking, by calling the invoking module, the application programming interface to receive first input data from the plurality of non-complaint emails and second input data from the plurality of complaint emails;

removing, by calling the removing module, sensitive information data from the received first input data and the second input data;

implementing, by calling the implementing module, a text style transfer algorithm to the first input data after removing the sensitive information data from the received first input data to generate complaints data from non-complaint emails data associated with the plurality non-complaint emails;

labeling, by calling the converting module, the plurality of non-complaint emails as a first set of complaint emails based on implementing the text style transfer algorithm;

augmenting, by calling the augmenting module, the plurality of complaint emails within the database with the labeled first set of complaint emails to train the model;

implementing, by calling the implementing module, a text generation model algorithm to the second input data to generate a second set of complaint emails from the plurality of complaint emails;

generating, by calling the generating module, a set of synthetic complaint emails based on the generated first set of complaint emails and the second set of complaint emails and obtaining the set of synthetic complaint emails by appending the generated first set of complaint emails with the generated second set of complaint emails;

validating, by a validating module communicatively coupled to the generating module, predictions on unlabeled samples generated by the initial model using user feedback received via a graphical user interface (GUI);

utilizing, by the training module, validated predictions data output from the validating module to retrain the initial model, thereby forming a feedback loop among the generating module, validating module, and training module that enhances performance of the STGM;

balancing, by the STGM, any possible data imbalance utilizing balanced data to validate generated data and feature distributions for retraining the models, wherein the balanced data is further utilized to generate and augment synthetic text samples using synonym and antonym replacement;

training, by calling the training module, the model based on the generated synthetic complaint emails; and applying, by the STGM, the trained model to a new set of emails to resolve the class imbalance in automatic complaint identification from the new set of emails.

17. The non-transitory computer readable medium according to claim 16, the instructions, when executed, cause the processor to further perform the following:

storing, after removing the sensitive information data, the first input data and the second input data onto a cloud data storage;

receiving the stored first input data and the second input data from the cloud data storage;

generating the synthetic complaint emails based on the received first input data and the second input data; and training the model based on the generated synthetic complaint emails.

* * * * *